(12) United States Patent
Clarke

(10) Patent No.: US 11,110,640 B2
(45) Date of Patent: Sep. 7, 2021

(54) CONTAINER AND MANUFACTURE THEREOF

(71) Applicant: Gr8 Engineering Limited, West Sussex (GB)

(72) Inventor: Peter Reginald Clarke, West Sussex (GB)

(73) Assignee: Gr8 Engineering Limited, West Sussex (GB)

( * ) Notice: Subject to any disclaimer, the term of this patent is extended or adjusted under 35 U.S.C. 154(b) by 364 days.

(21) Appl. No.: 16/315,682

(22) PCT Filed: Jul. 7, 2017

(86) PCT No.: PCT/EP2017/067131
§ 371 (c)(1),
(2) Date: Jan. 7, 2019

(87) PCT Pub. No.: WO2018/007604
PCT Pub. Date: Jan. 11, 2018

(65) Prior Publication Data
US 2019/0210265 A1 Jul. 11, 2019

(30) Foreign Application Priority Data
Jul. 8, 2016 (GB) .................................... 1611901

(51) Int. Cl.
*B29C 49/42* (2006.01)
*B29C 49/06* (2006.01)
(Continued)

(52) U.S. Cl.
CPC .......... *B29C 49/4273* (2013.01); *B29C 49/06* (2013.01); *B29C 49/12* (2013.01);
(Continued)

(58) Field of Classification Search
CPC ......... B29C 49/08; B29C 49/12; B29C 49/64; B29C 51/04; B29C 2049/1228
See application file for complete search history.

(56) References Cited

U.S. PATENT DOCUMENTS

| 4,131,666 A | 12/1978 | Agrawal et al. |
| 4,388,356 A | 6/1983 | Hrivnak et al. |
| (Continued) | | |

FOREIGN PATENT DOCUMENTS

| EP | 1253000 A1 | 10/2002 |
| EP | 1772251 A1 | 11/2007 |
| (Continued) | | |

OTHER PUBLICATIONS

UK Intellectual Property Office Combined Search and Examination Report under Sections 17 and 18(3) dated Jan. 12, 2017.
(Continued)

*Primary Examiner* — Jacob T Minskey
*Assistant Examiner* — Virak Nguon
(74) *Attorney, Agent, or Firm* — Polsinelli, P.C.

(57) ABSTRACT

A method of forming a container, the method comprising the steps of: providing an injection moulded preform composed of a biaxially-orientable thermoplastic material, the preform being substantially planar and having a peripheral edge and a central portion; clamping at least a portion of the peripheral edge of the preform in a frame; heating the preform; stretch blow moulding the heated preform, clamped with the frame, within a mould cavity defined by a first female mould to form an intermediate article having a bottom wall and an annular sidewall beneath an upper edge clamped within the frame, the stretch blow moulding step using a stretch rod to engage an inner side of at least the central portion of the preform and axially to stretch at least a part of the central portion of the preform prior to blowing a pressurized gas (Continued)

against the inner side which urges the opposite side of the preform radially outwardly against the mould; and shrinking the intermediate article, clamped with the frame, onto a second male mould to form a container having a bottom wall, defining a base, and an annular sidewall, defining a body portion, beneath the upper edge clamped within the frame, the container comprising biaxially oriented thermoplastic material in the annular sidewall and at least an outer portion of the bottom wall. Also disclosed is a wide mouth container which may be formed by the method.

18 Claims, 4 Drawing Sheets

(51) Int. Cl.
<table>
<tr><td>B29C 49/12</td><td>(2006.01)</td></tr>
<tr><td>B29C 49/64</td><td>(2006.01)</td></tr>
<tr><td>B29C 49/70</td><td>(2006.01)</td></tr>
<tr><td>B29C 51/04</td><td>(2006.01)</td></tr>
<tr><td>B29C 51/44</td><td>(2006.01)</td></tr>
<tr><td>B29K 67/00</td><td>(2006.01)</td></tr>
<tr><td>B29C 49/24</td><td>(2006.01)</td></tr>
<tr><td>B29L 31/00</td><td>(2006.01)</td></tr>
</table>

(52) U.S. Cl.
CPC .............. *B29C 49/64* (2013.01); *B29C 49/70* (2013.01); *B29C 51/04* (2013.01); *B29C 51/44* (2013.01); *B29C 2049/1228* (2013.01); *B29C 2049/2412* (2013.01); *B29K 2067/003* (2013.01); *B29K 2995/0041* (2013.01); *B29L 2031/712* (2013.01); *B29L 2031/716* (2013.01)

(56) References Cited

U.S. PATENT DOCUMENTS

<table>
<tr><td>4,665,682 A</td><td>5/1987</td><td>Kerins et al.</td></tr>
<tr><td>5,472,660 A</td><td>12/1995</td><td>Fortin</td></tr>
<tr><td>5,972,446 A</td><td>10/1999</td><td>Kaya et al.</td></tr>
<tr><td>2005/0196567 A1*</td><td>9/2005</td><td>Iwasaki ................ B32B 27/325<br>428/35.7</td></tr>
<tr><td>2005/0260371 A1</td><td>11/2005</td><td>Shi et al.</td></tr>
<tr><td>2006/0151924 A1*</td><td>7/2006</td><td>Iwasaki .................... B29C 51/04<br>264/544</td></tr>
<tr><td>2007/0082151 A1*</td><td>4/2007</td><td>Hatano .............. B65D 77/2024<br>428/35.7</td></tr>
<tr><td>2007/0290415 A1*</td><td>12/2007</td><td>Suenaga ................ B29C 51/04<br>264/532</td></tr>
</table>

FOREIGN PATENT DOCUMENTS

<table>
<tr><td>JP</td><td>07125053</td><td>5/1995</td></tr>
<tr><td>JP</td><td>2004291621</td><td>10/2004</td></tr>
<tr><td>JP</td><td>2005028657 A</td><td>2/2005</td></tr>
</table>

OTHER PUBLICATIONS

International Search Report and Written Opinion in PCT/EP2017/067131 dated Jan. 30, 2018.

\* cited by examiner

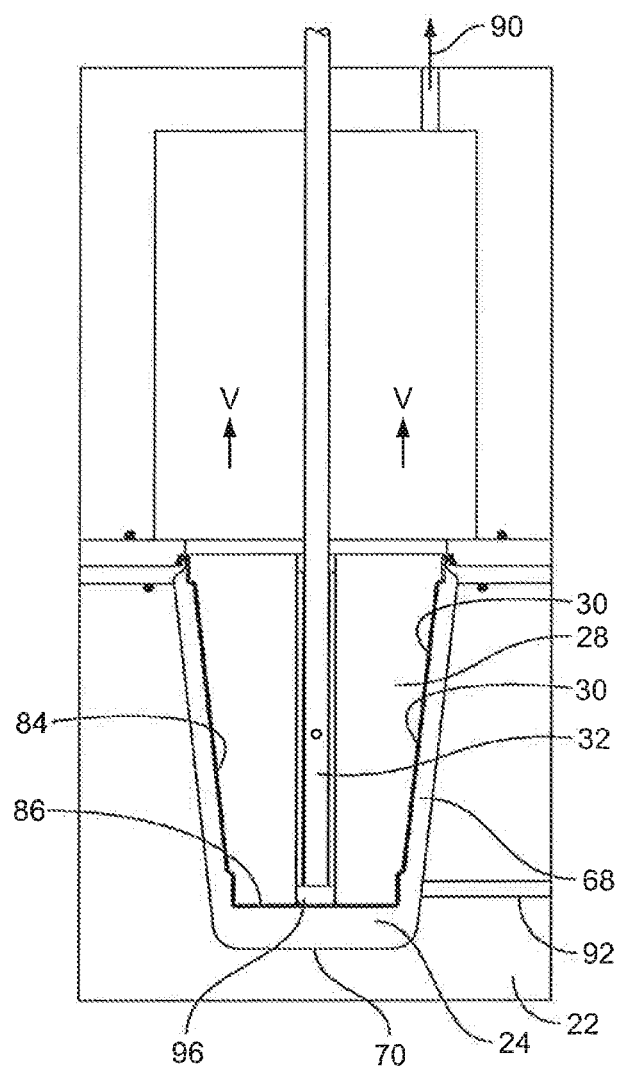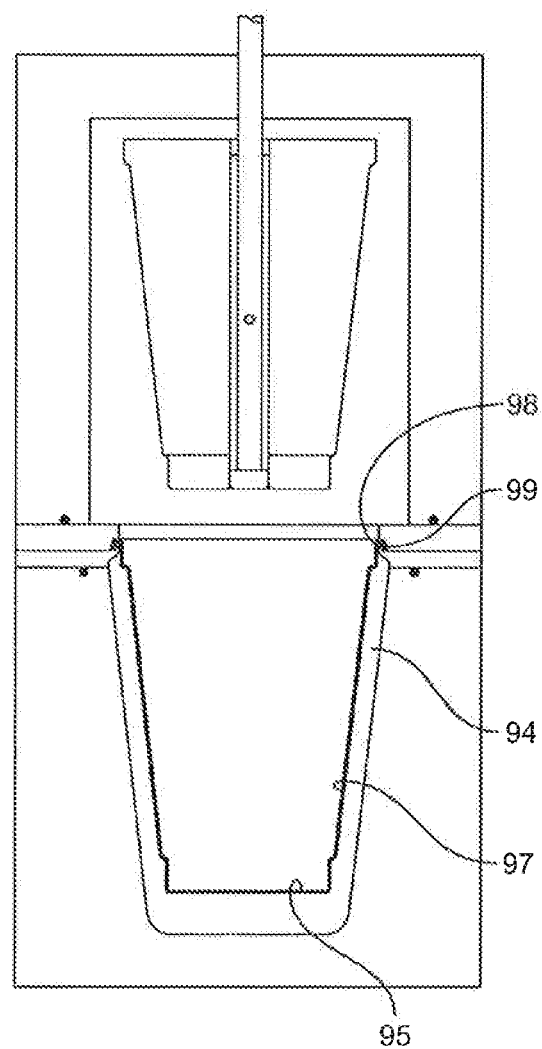

CONTAINER AND MANUFACTURE THEREOF

FIELD OF THE INVENTION

The present invention relates to a container and to a method of forming a container. In particular the present invention relates to the manufacture of containers which are transparent or translucent and are dimensionally stable at elevated temperatures, for example above 150° C., and therefore can be used to hold food to be cooked or reheated in a cooking oven or a microwave oven.

BACKGROUND

In the packaging industry, the process of blow moulding is often used in the manufacture of containers, particularly bottles for carbonated beverages. This process involves the initial formation of a preform, typically by injection moulding, which preforms are subsequently blow moulded to form the containers. Such preforms are typically formed of thermoplastic material, particularly polyethylene terephthalate (PET).

For the manufacture of containers in the form of wide-mouth containers such as trays, cups or tubs, typically thermoforming is used. A sheet of thermoplastic material, typically a polyolefin, is heated and then urged, by a movable mould member and a blowing pressure, into a mould cavity. Such trays, cups or tubs often suffer from the problem of poor mechanical properties, in particular poor impact resistance, particularly at low temperatures. This is because the thermoformed thermoplastic tends to exhibit poor molecular alignment or orientation, which may be monoaxial orientation or only a low degree of biaxial orientation. Furthermore, such trays, cups or tubs typically have low dimensional stability when subjected to elevated temperature, for example when placed in an oven to cook or reheat food. Also, such trays or tubs are typically opaque.

It is well known that biaxial orientation increases polymer toughness in thermoplastic packaging. However, conventional thermoforming processes tend to produce no or only low biaxial orientation, particularly in regions of the packaging which may be subjected to the greatest impact stresses during use, and so which require the greatest toughness or impact resistance.

It is known to produce trays, cups or tubs from polyethylene terephthalate (PET). However, these products typically have a low thermal stability, for example when subjected to elevated temperature, typically when placed in an oven to cook or reheat food, and/or low transparency or translucency.

Also, known trays, cups or tubs produced from polyethylene terephthalate (PET) may have a shape and configuration in which the sidewall of the container is inclined at an angle of at least 10 degrees to the longitudinal axis of the container. This particularly applies to containers which have been subjected to a multi-stage moulding process to increase the crystallinity of the PET by a heat setting process. Therefore the opening is significantly larger than the base, and correspondingly the volume of the container is relatively low for a given outer dimension of the upper edge of the container.

SUMMARY OF THE INVENTION

The present invention aims at least partially to overcome these problems of known containers and corresponding container manufacturing methods. There is a need in the art for a container, and a corresponding method of manufacture, which provides cost-effective containers having dimensions to enable them to be used as trays, cups or tubs, and which have good mechanical properties, for example impact resistance, thermal stability at elevated temperatures, for example at oven temperatures, and transparency/translucency, for example a transmissivity through at least a sidewall of the container of at least 90% in visible light.

There is a particular need in the art for transparent thermoplastic trays which can be subjected to elevated temperatures of typically above 150° C., even above 200° C., without thermal distortion so that such trays are "dual ovenable" i.e. can be placed in a microwave oven or a conventional oven to cook or reheat food without degradation of the tray. Such trays have particular application in the packaging of "cook-chill" food which is sold by many supermarkets and grocery stores, and is precooked (at least partially) and refrigerated and sold to the consumer for reheating/finish cooking at home.

The present invention provides a method of forming a container, the method comprising the steps of:
i) providing an injection moulded preform composed of a biaxially-orientable thermoplastic material, the preform being substantially planar and having a peripheral edge and a central portion;
ii) clamping at least a portion of the peripheral edge of the preform in a frame;
iii) heating the preform;
iv) stretch blow moulding the heated preform, clamped with the frame, within a mould cavity defined by a first female mould to form an intermediate article having a bottom wall and an annular sidewall beneath an upper edge clamped within the frame, the stretch blow moulding step using a stretch rod to engage an inner side of at least the central portion of the preform and axially to stretch at least a part of the central portion of the preform prior to blowing a pressurized gas against the inner side which urges the opposite side of the preform radially outwardly against the mould; and
v) shrinking the intermediate article, clamped with the frame, onto a second male mould to form a container having a bottom wall, defining a base, and an annular sidewall, defining a body portion, beneath the upper edge clamped within the frame, the container comprising biaxially oriented thermoplastic material in the annular sidewall and at least an outer portion of the bottom wall.

The present invention further provides a wide mouth container having a bottom wall, defining a base, and an annular sidewall, defining a body portion, beneath an upper peripheral edge, the wide mouth container having an opening surrounded by the upper peripheral edge, the container comprising biaxially oriented thermoplastic material in the annular sidewall and at least an outer portion of the bottom wall, wherein the thermoplastic material comprises polyethylene terephthalate, the crystallinity in the bottom wall and annular sidewall is from 30 to 40%, the stretch ratio of the biaxially oriented thermoplastic material in the annular sidewall and at least the outer portion of the bottom wall is from 1.5:1 to 15:1, the annular sidewall has a light transmissivity of at least 90% in visible light, and the bottom wall and annular sidewall have thermal stability and are not physically deformed when exposed to an oven air temperature of 150° C. for a period of 5 minutes.

The present invention is at least partly predicated on the finding by the present inventor that a container having excellent mechanical properties, in particular impact resistance as well as thermal stability at high temperatures and transparency in visible light, can be obtained by using the combination of an initial stretch blow moulding step and a subsequent thermoforming step which can also heat set the biaxial orientated thermoplastic material of the container. This can introduce biaxial orientation and high crystallinity throughout the container, particularly at the corners of the container, yet avoid excessive crystal growth. The result is a container with high impact resistance and thermal stability, coupled with high transparency. The container is robust at low, for example below freezing, and high, for example above 150° C., temperatures. Also, the container is preferably a wide mouth which, as a result of the sequential stretch blow moulding and thermoforming steps, can have a high volume and capacity for a given peripheral dimension.

In this specification the container may be in the form of any wide mouth container which may be in the form of a tray, tub, pot, jar optionally a threaded jar, cup, etc. The wide mouth of the container has an opening which has substantially the same or greater dimensions and area as compared to the body and base of the container. The container may have a variety of different shapes, dimensions and aspect ratios.

BRIEF DESCRIPTION OF THE DRAWINGS

Embodiments of the present invention will now be described by way of example only with reference to the accompanying drawings, in which:

FIGS. 1 to 6 are schematic cross-sections showing sequential steps in a method of stretch blow moulding a container in the form of a cup from an injection moulded preform in accordance with a further embodiment of the present invention, wherein:

FIG. 1 is a schematic cross sectional view of a preform mounted within a transport frame, between upper and lower mating frame members;

FIG. 2 is a schematic cross sectional view of the transport frame of FIG. 1 mounting the preform at a moulding station;

FIG. 3 is a schematic cross sectional view of a stretch rod being lowered in the direction of arrow D, in the apparatus of FIG. 2;

FIG. 4 is schematic cross sectional view after axial stretching of the preform and showing pressurized gas P being blown against the axially stretched preform, in the apparatus of FIG. 2;

FIG. 5 is a schematic cross sectional view of the stretch rod being retracted upwardly and a negative pressure V being provided by a source of vacuum, in the apparatus of FIG. 2; and FIG. 6 is a schematic cross sectional view of the stretch rod and upper male mould being retracted and the final moulded article, in the apparatus of FIG. 2.

DETAILED DESCRIPTION

Figure 1:
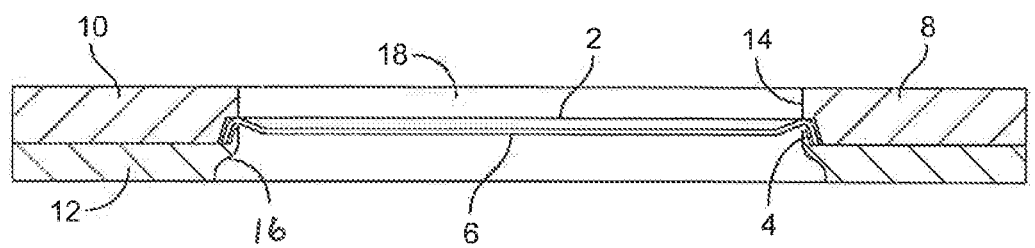

Referring to FIGS. 1 to 6, as shown in particular in FIG. 1 a preform 2 (shown enlarged in FIG. 1 as compared to FIGS. 2 to 6) is provided. The preform 2 is substantially planar and is composed of a biaxially-orientable thermoplastic material. In some embodiments, the thermoplastic material comprises polyester, typically at least one polyalkylene polyester or a blend of polyalkylene polyesters. Preferably the polyester comprises at least one polyester selected from polyethylene terephthalate, polybutylene terephthalate, polyethylene naphthalate and polybutylene naphthalate. Preferably, the biaxially-orientable thermoplastic material is polyethylene terephthalate.

In this embodiment the preform 2 has been formed by injection moulding. Alternatively, in any embodiment the preform may be formed from a sheet, optionally which has been formed by blowing, rolling or extruding the thermoplastic material into a sheet material which is then cut to form the sheet.

The material of the preform 2 is substantially unoriented and amorphous or alternatively the material may be semi-crystalline and have some orientation resulting from the injection moulding process (or sheet forming process, if the preform is formed from a sheet). Typically, the material of the preform 2 has less than 10% crystallinity.

The preform 2 has a peripheral edge in the form of a peripheral flange 4, which is typically annular, surrounding a central portion 6. The central portion 6 is to be stretch blow moulded. The central portion 6 typically has a wall thickness T of from 0.75 to 4 mm, optionally from 1 to 3 mm, for example from 1.25 to 1.75 mm.

Alternatively, when the container is a tray, the preform 2 has a wall thickness of from 0.3 to 0.75 mm, optionally from 0.4 to 0.6 mm, further optionally about 0.5 mm, over at least the central portion 6 of the preform 2.

Although in the illustrated embodiment the central portion 6 is shown with constant thickness, this is merely illustrative and is not essential and the portion 6 may vary in thickness. For example, the central portion 6 may be thicker in the middle and may be progressively thinner towards an outer edge of the central portion 6. Typically the peripheral flange 4 has a constant thickness.

In this embodiment, the preform 2, and correspondingly the resultant blow moulded container, have a circular plan. However, the preform 2 and the container may have any other desired shape. For example, the preform 2 and the resultant container may have a horizontal cross-section which is substantially shaped as follows: circular, oval, elliptical or polygonal, optionally square or rectangular. Furthermore, the vertical cross-section may have any desired shape or configuration.

The flange 4 is pre-shaped to form the upper edge of the container, and may include a lid-engaging or sealing surface structure composed of the thermoplastic material which is substantially unoriented. Accordingly, in preferred embodiments the upper edge of the container is adapted to engage a lid and the outer and upper edge, defined by the flange 4 in the illustrated embodiment, of the preform 2 is pre-shaped with a lid-engaging or sealing surface structure which is present in the stretch blow moulded container.

In preferred embodiments, the substantially planar preform 2 has an average bulk width W' and a bulk depth D, and the ratio of average bulk width W': bulk depth D, defining a bulk aspect ratio, is at least 5:1, optionally from 5:1 to 25:1. Typically the bulk depth D' is at most 25 mm, more typically from 2 to 25 mm, more typically from 5 to 20 mm.

The preform 2 is substantially planar. This means that overall general shape and configuration is planar but the preform may have some localised three-dimensional shaping. In preferred embodiments, the substantially planar preform 2 has a surface area (A) of from 500 to 50,000 mm$^2$, typically from 5,000 to 50,000 mm$^2$. Typically, the substantially planar preform 2 has a maximum width (W), and a wall thickness T, and the ratio of width (W): wall thickness (T) is from 250:1 to 350:1, optionally about 300:1. The 300:1 ratio for the parameters of entire length of the preform: preform wall thickness corresponds to a 150:1 ratio for the parameters of injection length extending from a central injection gate: preform thickness when the preform is injection moulded.

In order to achieve such high width: wall thickness aspect ratios, and low wall thickness preforms, and preforms having a high bulk aspect ratio, using thermoplastic materials which are compatible with both injection moulding to form the preform and the subsequent stretch blow moulding to form the container, a high pressure injection moulding process may be employed, such as disclosed in the Applicant's earlier patent specifications WO-A-2009/044142 and WO-A-2011/039296.

As mentioned above, the wall thickness of the central portion 6 may be varied. For example, for any wall thickness value (T) discussed above, the central portion 6 may be thinnest in a middle portion which has a diameter corresponding to about twice the stretch rod diameter, and the wall thickness increases to become progressively thicker in a direction towards the outer periphery of the base. This provides that the area of the preform base that will form the bottom corners of the resultant container has an increased wall thickness as compared to the thinnest part of the preform, the increase having a typical dimension of about 0.2 mm to 0.3 mm. The wall thickness then progressively thins down to the inward edge of the flange 4, where the stretchable part of the preform meets the un-stretched rim of the preform.

Other shapes and configurations to introduce corresponding structure into the walls or base of the container, such as indents, shoulders, etc. may be provided, as is known in the art. The flange 4 is not blow moulded but is clamped in position around and above the mould cavity, acting to hold the preform in position during the blow moulding step.

As shown in FIG. 1, the preform 2 is mounted within a transport frame 8. The frame 8 comprises a pair of upper and lower mating frame members 10, 12. The frame members 10, 12 each have a central opening 14, 16 which are aligned to form a composite opening 18 when the frame members 10, 12 are mated together. The preform 2 is mounted between the frame members 10, 12 in the mated configuration, with the peripheral edge 4 being clamped between the frame members 10, 12 and the central portion 6 located in the composite opening 18.

Figure 1A:
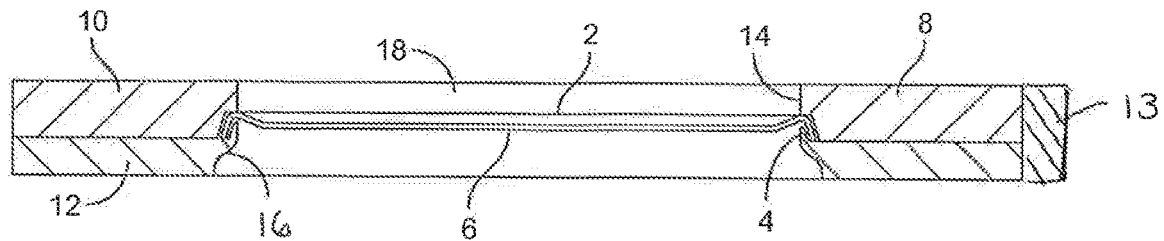
FIG. 1A is a schematic cross sectional view, same as FIG. 1, with an additional heating device shown.

In some embodiments, particularly when the preform 2 is composed of PET, the frame 8 is optionally coupled to a heating device 13 (as shown in FIG. 1A) for heating the frame 8 to a controlled temperature. The heating device 13 may be controlled to heat the lower frame member to a temperature of from 125° C. to 145° C. to induce crystallinity in the thermoplastic material in contact with the lower frame member, which thermoplastic material is preferably polyethylene terephthalate. Additionally or alternatively, the heating device may be controlled to heat the upper frame member to a temperature of from 65° C. to 100° C. to reduce or prevent the induction of surface crystallinity in the thermoplastic material in contact with the upper frame member, which thermoplastic material is preferably polyethylene terephthalate. A lidding film may be subsequently applied by application of at least one of heat and pressure to the thermoplastic material of reduced surface crystallinity after filling the container with contents to be packaged therein.

Figure 1B:
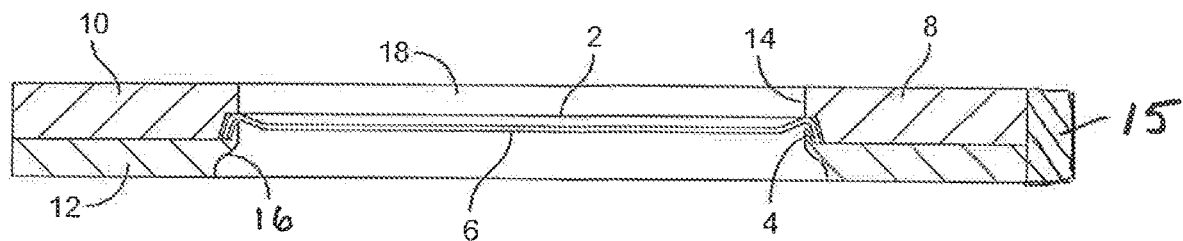
FIG. 1B is a schematic cross sectional view, same as FIG. 1, with an additional cooling device shown.

In other embodiments, particularly when the preform 2 is not composed of PET but may be composed of a polyolefin, for example, the frame 8 is optionally coupled to a cooling device 15 (as shown in FIG. 1B) for cooling the frame to a controlled temperature. The cooling device 15 may be controlled to cool the upper frame member to a temperature of from 5° C. to 20° C. to reduce or prevent the induction of crystallinity in the thermoplastic material in contact with the upper frame member.

The preform 2 mounted in the transport frame 8 is heated to a stretch blow moulding temperature, the heating using any suitable heating method known in the art for heating preforms.

The preform 2 is heated with at least one heated element. The heating may be conductive by contact with the at least one heated element or alternatively may be heated by infrared or near-infrared radiation or may be preheated using infrared or near-infrared radiation and then conditioned conductively using contact with the at least one heated element. In preferred embodiments, the preform 2 is differentially heated so that preform material in a first region of the preform 2, which is to form a corner in the resultant container between a container bottom wall and a container annular sidewall, is heated to a lower temperature than at least one adjacent second region of the preform 2. This reduces the stretching in that lower temperature region during axial stretching, thereby ensuring that sufficient material thickness is present in that region after axial stretching to achieve a desired thickness in the corners of the container after the subsequent blow moulding step.

The present invention may use a continuous "one step" moulding process in which the preform is injection moulded and then the still-heated preform is blow moulded. The "one step" moulding process employs a preform which is sufficiently thick, for example up to 4 mm thick, so that sufficient heat is retained within the preform for the blow moulding of the preform.

Alternatively, the present invention may use a discontinuous "two step" moulding process, called a reheat blow moulding process, in which the preform is injection moulded and then cooled, and subsequently the cooled preform reheated and then is blow moulded. The "two step" moulding process may employ a preform which is thin, so that the preform can be rapidly and uniformly reheated for the blow moulding of the preform. The reheat blow moulding process tends to provide increased biaxial orientation, and therefore increased mechanical properties in thinner and lighter containers, in the resultant containers as compared to the one step process.

In some embodiments, the method is a two-step reheat blow moulding method in which the injection moulded preform 2 is cooled to ambient temperature prior to the heating step ii). In some embodiments, the heating step heats the preform 2 from a temperature of less than 35° C. in a reheat step after the injection moulded preform has cooled, after the injection moulding step, to a temperature of less than 35° C.

If the preform is formed from a sheet, correspondingly a one-step or two-step moulding process may be employed.

Figure 2:
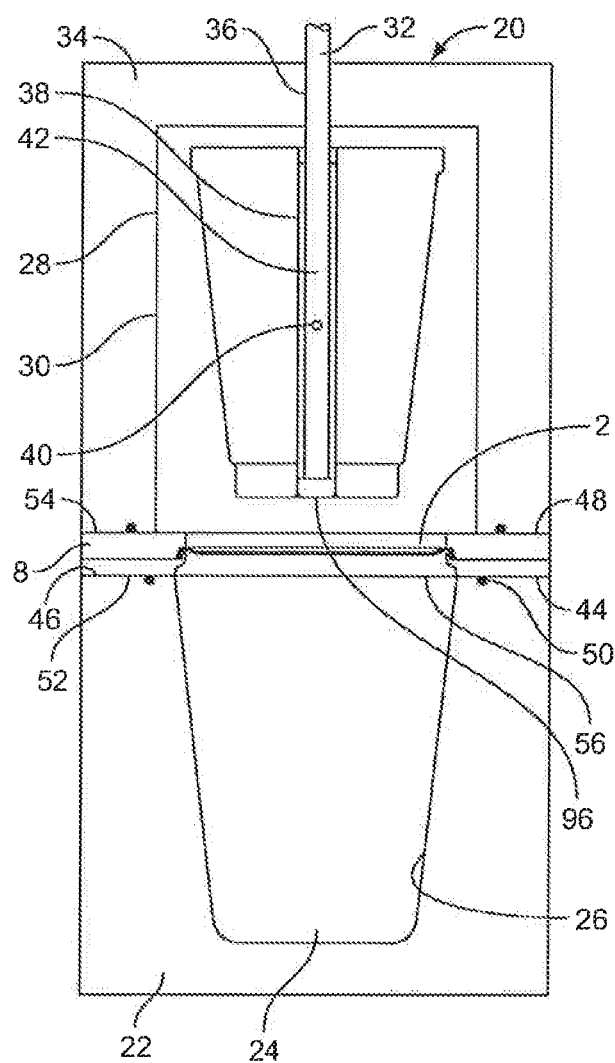

Referring to FIG. 2, the transport frame 8 mounting the heated preform 2 is transported to a moulding station 20.

The moulding station 20 includes a lower female mould 22 defining a mould cavity 24 surrounded by an inner moulding surface 26. In this embodiment, the inner moulding surface 26 defines the outer shape of an intermediate article to be stretch blow moulded from the preform 2. The moulding station 20 also includes an upper male mould 28 having an outer moulding surface 30 which defines the inner shape of a container in the form of a cup to be formed from the intermediate article. As described hereinafter, the stretch blow moulding forms the intermediate article from the preform 2 by the inner moulding surface 26 moulding the outer shape of the intermediate article, and then the intermediate article is subsequently moulded by the outer moulding surface 30 to form the container. The lower female mould 22 and upper male mould 28 are axially aligned.

The moulding station 20 further includes a stretch rod 32 extending through the upper male mould 28. A housing 34 surrounds the upper male mould 28 and supports the stretch rod 32. The stretch rod 32 is slidable within a hole 36 in the housing 34 and within an elongate hole 38 in the upper male mould 28. The stretch rod 32 is axially aligned with the lower female mould 22 and the upper male mould 28.

The stretch rod 32 has a cylindrical shape with a hemispherical free lower end 96. The stretch rod 32 may include a central conduit 42 for introducing a blowing gas under pressure downwardly into the mould cavity 24 during the blowing operation, the outer surface of the stretch rod 32 including gas outlet holes 40 communicating with the central conduit 42. Typically, the stretch rod 32 has a diameter of from 12 to 20 mm, typically from 14 to 18 mm, most typically about 16 mm.

The lower female mould 22 and the housing 34 are mutually spaced to provide a vertical gap 44 therebetween.

At the moulding station 20, the transport frame 8 mounting the heated preform 2 is located in the vertical gap 44. The lower female mould 22 is below the preform 2 and the upper male mould 28 and the stretch rod 32, both supported in the housing 34, are above the preform 2.

The upper edge 46 of the lower female mould 22 and the lower edge 48 of the housing 34 are respectively sealed, optionally by a hermetic seal 50, against lower and upper surfaces 52, 54 of the transport frame 8. The central portion 6 is located over, and axially aligned with, an open face 56 of the mould cavity 24.

As described below, the central portion 6 is then stretch blow moulded, whereas the flange 4 is not stretch blow moulded but is clamped in position around and above the mould cavity 24, acting to hold the preform 2 in position during the subsequent moulding steps.

The central portion 6 of the preform 2 has been preheated to a temperature above its glass transition temperature so as to be readily mouldable by stretch blow moulding, and such a temperature range for biaxially orientable polymers such as PET is well known in the art. The lower female mould 22 and upper male mould 28 are heated to an elevated temperature, but to different temperatures so that the lower female mould 22 has a higher temperature than the upper male mould 28. Preferably, the lower female mould 22 has a temperature which is higher than a glass transition temperature of the thermoplastic material. Typically the lower female mould 22 has a temperature of from 160 to 250° C. Preferably, the upper male mould 28 has a temperature which is higher than a glass transition temperature of the thermoplastic material. Typically the upper male mould 28 has a temperature of from 80 to 120° C., optionally from 95° C. to 105° C., for example about 100° C. These temperatures are particularly selected for moulding PET, and if other polymers are moulded the skilled person would be readily able to provide suitable alternative temperatures. The relatively higher temperature of the lower female mould 22 is selected to anneal the stretch blown polymer and the relatively lower temperature of the upper male mould 28 is selected to thermoform, and increase the crystallinity of, the polymer after shrinking from the stretch blown state. The thermoplastic material of the intermediate article is annealed against the heated moulding surface of the first female mould 22 optionally for a period of from 0.5 to 2 seconds.

Figure 3:
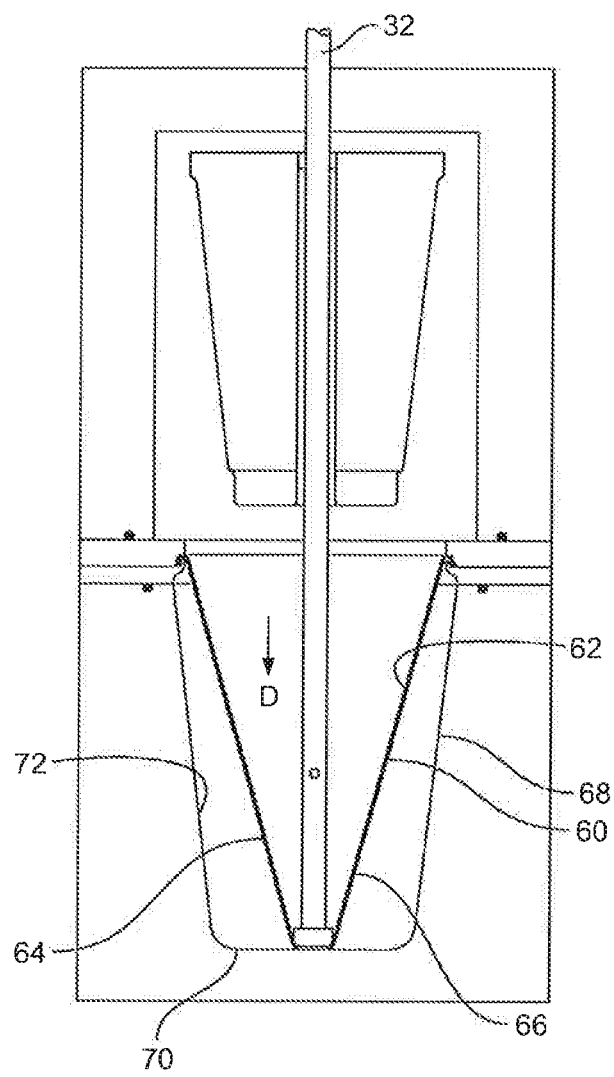

Referring to FIG. 3, the stretch rod 32 is lowered in the direction of arrow D. This causes the preform 2 to be deformed and stretched downwardly to form a substantially inverted conical shape 60. The stretch rod 32 engages an inner side 62 of the preform 2 and axially stretches at least a part of the preform 2 prior to a subsequent blowing step. After the preform 2 has been axially stretched by the stretch rod 32 and before blowing of the pressurized gas against the inner side during a blowing step, the axially stretched preform 2 includes a portion 64 with a substantially conical shape having an axis aligned with the stretch rod 32.

The stretch rod 32 introduces axial orientation, and consequently axial strain, into at least a central part 66 of the preform 2. The axial stretch ratio in the central part 66 is greater than 1.3:1 to achieve strain induced crystallinity in the polymer, which ensures that the resultant crystals have a dimension of less than 0.5 microns and are invisible to the naked eye.

The stretch rod 32 is moved a selected downward distance against the preform 2 so that the stretch rod 32 axially stretches at least part of the substantially planar preform 2 by a distance which is from 35 to 150% of the height of the annular sidewall of the resultant container, the height corresponding to the height of the outer moulding surface 30 of the upper male mould 28 which defines the inner shape of a container. As shown in FIG. 3, preferably the stretch rod 32 is moved downwardly by a distance which is from 75 to 100%, preferably substantially the entire depth of the cavity 24 defined by the cavity sidewall 68, and urges the preform material against the bottom wall 70 of the cavity 24. The stretch rod 32 axially stretches at least part of the substantially planar preform 2 to provide an axial stretch ratio of the biaxially oriented thermoplastic material in an annular sidewall of the intermediate article which is greater than 1.3:1, optionally from greater than 1.3:1 to up to 15:1, further optionally from 1.5:1 to 10:1.

In the illustrated embodiment, a single stretch rod 32 is used but in alternative embodiments, particularly for preforms for producing containers having a large surface are, for example in the form of trays, a plurality of mutually laterally spaced stretch rods is provided which engage respective mutually spaced areas on the inner side of the preform.

Figure 4:
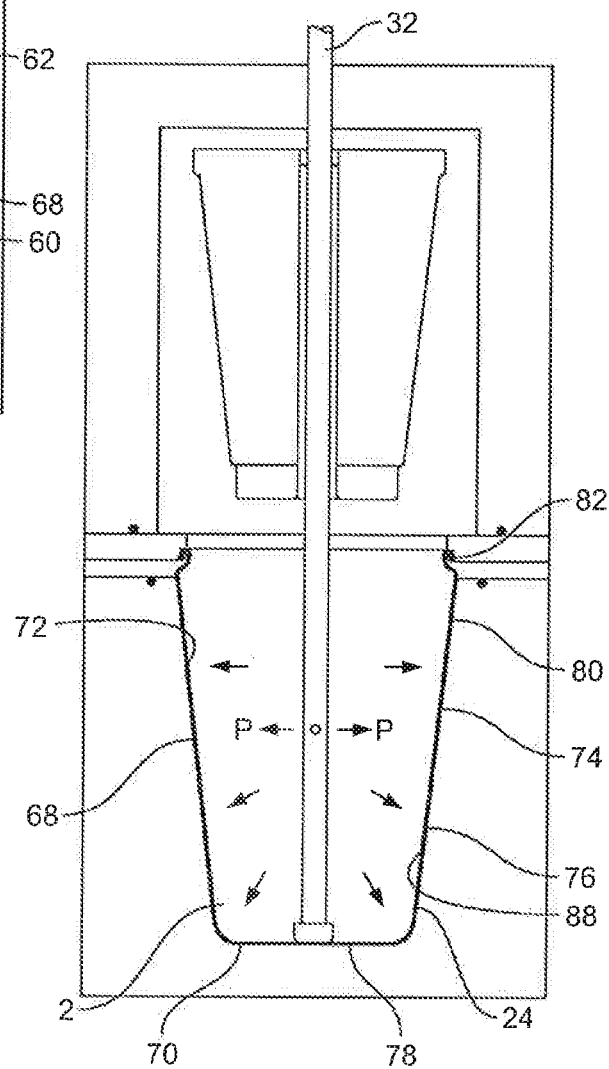

Referring to FIG. 4, after the axial stretching by the stretch rod 32, a pressurized blowing gas, such as air, is blown against the inner side 72 of the axially stretched preform 2. The pressurized blowing gas is indicated by arrows P. As discussed above, the pressurized blowing gas may be wholly or partly emitted from the stretch rod 32. Typically, the pressurized gas has a pressure of at least 8 bar ($8 \times 10^5$ N/m$^2$), for example from 10 to 20 bar ($10 \times 10^5$ to $20 \times 10^5$ N/m$^2$), more typically from 10 to 15 bar ($10 \times 10^5$ to $15 \times 10^5$ N/m$^2$).

The pressurized gas urges the conical side of the preform 2 radially outwardly against the outer moulding surface 26 of the lower female mould 22 defining the mould cavity 24.

The preform 2 is urged outwardly so as to contact and assume the shape of the sidewall 68 and the bottom wall 70 of the cavity 24. The outer moulding surface 26 defines the outer shape 74 of an intermediate moulded article 76 which has been stretch blow moulded from the preform 2. As described hereinafter, the intermediate article 76 is larger than the desired shape of the final blow moulded container.

The intermediate moulded article 76 has a bottom wall 78 and an annular sidewall 80 having an upper edge 82 defined by the preform flange 4.

The pressurized gas creates radial stretch in the intermediate moulded article 76, in addition to the axial stretch caused by the stretch rod 32. The radial stretch increases the strain induced crystallinity of the polymer, and again the crystals are invisible to the naked eye. The resultant blown polymer has a very high level of transparency.

The intermediate moulded article 76 is blown against the hot moulding surface 26 which is oversized relative to the final container to be manufactured. The polymer is permitted to anneal against the hot moulding surface 26, thereby to reduce or eliminate stresses induced by the blowing step, but for a time period insufficient to cause any significant increase in crystallization or crystal growth, so that the polymer retains a very high level of transparency.

Thereafter the upper male mould 28 having the inner moulding surface 30 is lowered into the moulding cavity 24. The upper male mould 28 is in the form of a plug which partially fills the moulding cavity 24 when inserted thereinto. In the inserted configuration, the side surface 84 and lower surface 86 of the upper male mould 28 are respectively spaced from the sidewall 68 and the bottom wall 70 of the cavity 24 of the lower female mould 22.

The inner moulding surface 30 is thereby inwardly and upwardly spaced from the intermediate moulded article 76 which is disposed inwardly against the outer moulding surface 26.

Referring to FIG. 5, the stretch rod 32 is retracted upwardly so that the lower end 96 of the stretch rod 32 is disposed within the upper male mould 28, and preferably is aligned with the lower surface 86 of the upper male mould 28. The positive blowing pressure above the intermediate moulded article 76, and thereby acting on the inner surface 88 of the intermediate moulded article 76, is terminated, and in contrast a negative pressure V, provided by a source of vacuum 90, is applied to the upper male mould 28. The negative pressure V is above, and applied to the inner surface 88 of, the intermediate moulded article 76. The negative pressure V causes the intermediate moulded article 76 to be sucked upwardly into contact with the inner moulding surface 30.

Optionally, a low positive air pressure may be applied through a conduit 92 communicating with the outer moulding surface 26 to introduce positive air pressure into the moulding cavity 24 beneath the intermediate moulded article 76 to cause the intermediate moulded article 76 additionally to be blown upwardly into contact with the inner moulding surface 30.

The transfer of the intermediate moulded article 76 from the outer moulding surface 26 onto the inner moulding surface 30 causes shrinkage of the intermediate moulded article 76 to form a final moulded article 94 having the shape and dimensions of the final container to be stretch blow moulded from the preform 2.

The container, comprising the final moulded article 94, is heat set by holding the container at an elevated temperature in contact with the second male mould 28 thereby to increase the crystallinity of the thermoplastic material. The crystallinity of the thermoplastic material in the sidewall is increased during contact of the container on the second male mould 28, optionally from a crystallinity value in the sidewall of the intermediate article 76 of less than 30%, typically from 20 to less than 30%, to a crystallinity value in the sidewall of the container 94 of greater than 30% typically from 30 to 45%.

The intermediate article 76 shrinks to form the container 94 so that at least 50%, optionally from 75 to 100%, further optionally from 95 to 100%, of the surface area of the bottom wall and annular sidewall of the intermediate article 76 are shrunk inwardly onto the second male mould 28 by a distance of from 0.5 to 5 mm, optionally from 1 to 4 mm, further optionally from 1 to 3 mm, yet further optionally from 1.5 to 2.5 mm.

Referring to FIG. 6, the stretch rod 32 and the upper male mould 28 are subsequently retracted into the housing 34. The final moulded article 94 is separated from the upper male mould 28 by positive low air pressure applied through the stretch rod 32. Such positive air pressure assists demoulding of the final moulded article 94 from the inner moulding surface 30.

Finally, the moulding station 20 is disassembled, by separating the transport frame 8 carrying the final moulded article 94 from the housing 34 and the lower female mould 22, and then the transport frame 8 is disassembled to release the final moulded article 94.

The final moulded article 94 has a bottom wall 95, a sidewall 97 and a wide mouth 98 terminating in a flanged edge 99. The upper edge 99 of the container may include a lid-engaging or sealing surface structure composed of the thermoplastic material which is substantially unoriented.

The container is a wide mouth container having an opening surrounded by the upper edge. The opening preferably has substantially the same or greater dimensions and area as compared to the body portion and base of the container. In some embodiments, the opening may have an area which is from 102 to 120% of an area of the base of the container. In other embodiments, the opening may have reduced dimensions and area as compared to the body portion and base of the container, for example when the container is a threaded jar configured so that when a closure is threaded onto the thread of the jar surrounding the opening the outer peripheral edge of the closure does not extend beyond the outer peripheral edge of the threaded jar. In some embodiments of such a threaded jar, the opening may have an area which is from 75 to 98% of an area of the base of the container.

In some embodiments, such as for cups, jars or tubs for example, at least 50% of the surface area of the annular sidewall of the container is inclined at an angle of less than 5 degrees, optionally from 1 to 3 degrees, to a longitudinal axis of the container extending from the base to the opening. In other embodiments, the container is a wide mouth container in the form of a tray and at least 50%, optionally at least 75% or substantially 100%, of the surface area of the annular sidewall of the tray is inclined at an angle, that is a draft angle, of less than 15 degrees, optionally from 5 to 15 degrees, further optionally from 7 to 12 degrees, typically about 10 degrees, to a longitudinal axis of the container extending from the base to the opening.

This method can produce a container which has a wide mouth, for example a tray, cup, jar, for example a threaded jar, or tub, composed of biaxially oriented polymer, such as a polyester, typically PET, having high visual clarity and high heat stability as a result of achieving high strain-induced crystallization during the stretch blow moulding process. The container can provide a highly transparent thermoplastic container, such as a tray, which can be subjected to elevated temperatures of typically above 150° C., even above 200° C., without thermal distortion so that such a container is "dual ovenable" i.e. can be placed in a microwave oven or a conventional oven to cook or reheat food without degradation of the tray.

Additionally, by having high biaxial orientation, the container is adapted to contain a frozen product at a temperature of less than 0° C., for example ice-cream or sorbet, without fracturing.

The container is produced from a substantially planar preform. The wide mouth container typically has a depth:width ratio of at least 1.2:1 which can achieve strain induced crystallinity without excessive thinning or weakening of the wide mouth container 94 at corners, in particular where the bottom wall 95 and sidewall 97 intersect.

The moulding cycle time is typically from 6 to 8 seconds. This is a low time period to expose the polymer to elevated temperatures, which minimizes thermal crystallization and ensures high visual clarity of the resultant container 94.

The preform thickness can be varied in conjunction with differential contact heating, described above, of the preform to maintain a substantially even wall section or a locally thicker wall in the resultant container. For example the annular edge parts of the preform may have a constant thickness because these edge parts are commonly contacted during heating and therefore may be heated to a common temperature whereas the central area of the preform may have varying thickness so as to be conductively heated to correspondingly different temperatures by conductive heating.

The combination of the axial stretch and the radial blowing, and subsequent axial and radial shrinkage, produce highly biaxially oriented thermoplastic material in the annular sidewall and at least an outer portion of the bottom wall of the container, which introduces a high degree of strain induced crystallization and avoids excessive crystal growth so that the resultant polymer walls of the container are transparent or translucent. Typically, the stretch ratio of the biaxially oriented thermoplastic material in the annular sidewall and at least the outer portion of the bottom wall is from 1.5:1 to 15:1, optionally from 1.5:1 to 10:1, for example about 10:1. In addition, the higher the aspect ratio of the container the higher the axial stretch ratio of the sidewall when blow moulding the container using the present invention. Typically, the thermoplastic material comprises polyethylene terephthalate, the crystallinity in the bottom wall and annular sidewall is from 30 to 40%, the annular sidewall has a light transmissivity of at least 90% in visible light, and the bottom wall and annular sidewall have thermal stability and are not physically deformed when exposed to an oven air temperature of 150° C. for a period of 5 minutes.

Typically, the container bottom wall has a surface area of from 500 to 50,000 mm$^2$ and the annular sidewall has a height of from 25 to 150 mm. Preferably, the resultant containers are nestable or stackable.

In any of the embodiments of the invention, the method may further comprise further heat setting the container after the stretch blow moulding and shrinking steps. This may be achieved by holding the container at an elevated temperature within the housing thereby to increase the crystallinity of the thermoplastic material. In any of the embodiments of the invention, the method may further comprise quench cooling the container after the stretch blow moulding and shrinking steps. The quench cooling step can maintain the crystallinity of the thermoplastic material below a preset maximum threshold value.

For example, the biaxially oriented thermoplastic material in the annular sidewall and at least the outer portion of the bottom wall may be heat set to have a crystallinity of at least 30%, for example having a maximum crystallinity of 35% or a crystallinity of from 35 to 55%.

In any of the embodiments of the invention, the method may further comprise in-mould labeling on an outer side of the container.

In one embodiment, the label is pre-charged with static electricity prior to being placed in the mould cavity before the stretch blow moulding step. In a modification of that embodiment, or in another embodiment, an inwardly directed face of the label to be adhered to the intermediate article outer surface is coated with a meltable layer, for example a low melting point polyolefin such as polyethylene, which has a melting point lower than the temperature of the preform during blow moulding, for bonding the label to the intermediate article by fusion of the meltable layer.

The in-mould labeling step may be optionally further modified by providing a profiled outer surface preform which provides a plurality of air channels between the label and the preform surface. The channels provide passages for escape of air from between the label and the blown intermediate article outside surface which would otherwise cause blistering underneath the label.

Various modifications to the illustrated embodiments will be apparent to those skilled in the art and are intended to be included within the scope of the present invention.

The invention claimed is:

1. A method of forming a container, the method comprising the steps of:
   i) providing an injection moulded preform composed of a biaxially-orientable thermoplastic material, the preform being substantially planar and having a peripheral edge and a central portion;
   ii) clamping at least a portion of the peripheral edge of the preform in a frame, wherein the frame comprises a pair of upper and lower mating frame members forming an opening in the frame, wherein the peripheral edge is clamped between the frame members and the central portion is located in the opening and the frame is coupled to a heating device for heating the frame to a controlled temperature or the frame is coupled to a cooling device for cooling the frame to a controlled temperature;
   iii) heating the preform, wherein the preform is clamped in the frame during the heating step iii;
   iv) stretch blow moulding the heated preform, clamped with the frame, within a mould cavity defined by a first female mould to form an intermediate article having a bottom wall and an annular sidewall beneath an upper edge clamped within the frame, the stretch blow moulding step using a stretch rod to engage an inner side of at least the central portion of the preform and axially to stretch at least a part of the central portion of the preform prior to blowing a pressurized gas against the inner side which urges the opposite side of the preform radially outwardly against the mould; and
   v) shrinking the intermediate article, clamped with the frame, onto a second male mould to form a container having a bottom wall, defining a base, and an annular sidewall, defining a body portion, beneath the upper edge clamped within the frame, the container comprising biaxially oriented thermoplastic material in the annular sidewall and at least an outer portion of the bottom wall.

2. A method according to claim 1 wherein the substantially planar preform has a wall thickness T of from 0.75 to 4 mm, or from 1 to 3 mm, or from 1.25 to 1.75 mm, over at least the central portion of the preform.

3. A method according to claim 1 wherein the container is a tray and the substantially planar preform has a wall thickness T of from 0.3 to 0.75 mm, or from 0.4 to 0.6 mm, or about 0.5 mm, over at least the central portion of the preform.

4. A method according to claim 1 wherein the substantially planar preform has an overall general shape and configuration which is planar and the preform has some localised three-dimensional shaping.

5. A method according to claim 1 wherein the heating device is controlled to heat the lower frame member to a temperature of from 125° C. to 145° C. to induce crystallinity in the thermoplastic material in contact with the lower frame member, which thermoplastic material is polyethylene terephthalate.

6. A method according to claim 5 wherein the heating device is controlled to heat the upper frame member to a temperature of from 65° C. to 100° C. to reduce or prevent the induction of surface crystallinity in the thermoplastic material in contact with the upper frame member, which thermoplastic material is polyethylene terephthalate.

7. A method according to claim 6 wherein a lidding film is subsequently applied by application of at least one of heat and pressure to the thermoplastic material of reduced surface crystallinity after filling the container with contents to be packaged therein.

8. A method according to claim 1 wherein the cooling device is controlled to cool the upper frame member to a temperature of from 5° C. to 20° C. to reduce or prevent the induction of crystallinity in the thermoplastic material in contact with the upper frame member.

9. A method according to claim 1 wherein during the heating step iii the preform is heated either conductively by contact with at least one heated element or by preheating using infrared and/or near-infrared and/or microwave radiation and subsequent thermal conditioning by conductive contact with at least one heated element.

10. A method according to claim 1 wherein during the heating step iii the preform is differentially heated so that preform material in a first region to form a corner in the container between the bottom wall and the annular sidewall is heated to a lower temperature than at least one adjacent second region.

11. A method according to claim 1 wherein at least an annular outer part of the preform has a constant thickness which is heated to a common temperature during the heating step iii.

12. A method according to claim 1 wherein at least the central portion of the preform has a varying thickness which is heated to correspondingly varying temperatures during the heating step iii.

13. A method according to claim 1 wherein in step (v) the second male mould has a temperature which is higher than a glass transition temperature of the thermoplastic material, or lower than a temperature of the first female mould, or from 80 to 120° C., or from 95 to 105° C., and step (v) thermoforms the container.

14. A method according to claim 13 further comprising heat setting the container by holding the container at an elevated temperature in contact with the second male mould thereby to increase the crystallinity of the thermoplastic material.

15. A method according to claim 14 wherein in step (v) the crystallinity of the thermoplastic material in the sidewall is increased during contact of the container on the second male mould, from a crystallinity value in the sidewall of the intermediate article of less than 30%, or from 20 to less than 30%, to a crystallinity value in the sidewall of the container of greater than 30%, or from 30 to 45%.

16. A method according to claim 1 wherein in step (v) the intermediate article shrinks to form the container so that at least 50%, or from 75 to 100%, or from 95 to 100%, of the surface area of the bottom wall and annular sidewall of the intermediate article are shrunk inwardly onto the second male mould by a distance of from 0.5 to 5 mm, or from 1 to 4 mm, or from 1 to 3 mm, or from 1.5 to 2.5 mm.

17. A method of forming a container, the method comprising the steps of:
  i) providing an injection moulded preform composed of a biaxially-orientable thermoplastic material, the preform being substantially planar and having a peripheral edge and a central portion;
  ii) clamping at least a portion of the peripheral edge of the preform in a frame, wherein the frame comprises a pair of upper and lower mating frame members forming an opening in the frame, wherein the peripheral edge is clamped between the frame members and the central portion is located in the opening;
  iii) heating the preform, wherein the frame is coupled to a heating device for heating the frame to a controlled temperature, wherein the heating device is controlled to heat the lower frame member to a first temperature and to heat the upper frame member to a second temperature, wherein the second temperature is lower than the first temperature;
  iv) stretch blow moulding the heated preform, clamped with the frame, within a mould cavity defined by a first female mould to form an intermediate article having a bottom wall and an annular sidewall beneath an upper edge clamped within the frame, the stretch blow moulding step using a stretch rod to engage an inner side of at least the central portion of the preform and axially to stretch at least a part of the central portion of the preform prior to blowing a pressurized gas against the inner side which urges the opposite side of the preform radially outwardly against the mould; and
  v) shrinking the intermediate article, clamped with the frame, onto a second male mould to form a container having a bottom wall, defining a base, and an annular sidewall, defining a body portion, beneath the upper edge clamped within the frame, the container comprising biaxially oriented thermoplastic material in the annular sidewall and at least an outer portion of the bottom wall.

18. A method of forming a container, the method comprising the steps of:
  i) providing an injection moulded preform composed of a biaxially-orientable thermoplastic material, the preform being substantially planar and having a peripheral edge and a central portion;
  ii) clamping at least a portion of the peripheral edge of the preform in a frame, wherein the frame comprises a pair of upper and lower mating frame members forming an opening in the frame, wherein the peripheral edge is clamped between the frame members and the central portion is located in the opening and the frame is coupled to a heating device for heating the frame to a controlled temperature or the frame is coupled to a cooling device for cooling the frame to a controlled temperature;
  iii) heating the preform, wherein the preform is clamped in the frame during the heating step iii;
  iv) stretch blow moulding the heated preform, clamped with the frame, within a mould cavity defined by a first female mould to form an intermediate article having a bottom wall and an annular sidewall beneath an upper edge clamped within the frame, the stretch blow moulding step using a stretch rod to engage an inner side of at least the central portion of the preform and axially to stretch at least a part of the central portion of the preform prior to blowing a pressurized gas against the inner side which urges the opposite side of the preform radially outwardly against the mould; and v) shrinking the intermediate article, clamped with the frame, onto a second male mould to form a container having a bottom wall, defining a base, and an annular sidewall, defining a body portion, beneath the upper edge clamped within the frame, the container comprising biaxially oriented thermoplastic material in the annular sidewall and at least an outer portion of the bottom wall, wherein in step (v) the second male mould has a temperature which is higher than a glass transition temperature of the thermoplastic material and step (v) thermoforms the container and heat sets the container by holding the container at an elevated temperature in contact with the second male mould thereby to increase the crystallinity of the thermoplastic material in the sidewall during contact of the container on the second male mould from a crystallinity value in the sidewall of the intermediate article of less than 30% to a crystallinity value in the sidewall of the container of greater than 30%.

* * * * *